United States Patent
von Hackewitz

(10) Patent No.: US 6,640,947 B2
(45) Date of Patent: Nov. 4, 2003

(54) ROLLING ELEMENT CLUTCH

(76) Inventor: Friedrich-Wilhelm von Hackewitz, Lauerweg 2, Schweinfurt (DE), 97422

(*) Notice: Subject to any disclaimer, the term of this patent is extended or adjusted under 35 U.S.C. 154(b) by 0 days.

(21) Appl. No.: 10/144,469

(22) Filed: May 13, 2002

(65) Prior Publication Data

US 2003/0015388 A1 Jan. 23, 2003

(30) Foreign Application Priority Data

May 11, 2001 (DE) .......................... 101 23 082

(51) Int. Cl.[7] .............................. F16D 41/06
(52) U.S. Cl. ................................ 192/45
(58) Field of Search ................. 192/45, 41 R; 188/82.84

(56) References Cited

U.S. PATENT DOCUMENTS

| | | | |
|---|---|---|---|
| 1,929,782 A | | 10/1933 | Hughes |
| 2,865,479 A | | 12/1958 | Hungerford |
| 3,187,863 A | | 6/1965 | Giometti |
| 3,800,927 A | * | 4/1974 | Takata ......................... 192/45 |
| 4,236,619 A | * | 12/1980 | Kuroda ........................ 192/45 |
| 4,566,567 A | * | 1/1986 | Miyatake ..................... 192/45 |
| 5,035,309 A | * | 7/1991 | Takada ......................... 192/45 |
| 5,062,512 A | * | 11/1991 | Lederman .................... 192/45 |
| 5,664,653 A | * | 9/1997 | Kurita et al. ............... 192/45.1 |
| 5,722,521 A | * | 3/1998 | Awaji et al. ................. 192/45 |
| 6,315,098 B1 | * | 11/2001 | Roberts ....................... 192/44 |

FOREIGN PATENT DOCUMENTS

| | | |
|---|---|---|
| DE | 1-927-865 | 11/1965 |
| DE | 28-20-761 A1 | 11/1979 |
| WO | WO 93/00523 | 1/1993 |

OTHER PUBLICATIONS

DE Patent Office Search Report, Mar. 15, 2002.
Maschinen—elemente, G. Niemann, H. Winter, vol. III, second completely revised Edition, Publishing Company Springer (1986), p. 278, Fig. 30 / 27b).

* cited by examiner

*Primary Examiner*—Saul Rodriguez
(74) *Attorney, Agent, or Firm*—Amster, Rothstein & Ebenstein

(57) ABSTRACT

A rolling element clutch (1) includes an outer ring (2), an inner ring (3) and a cage ring (6) mounted there between, which has a plurality of circumferentially spaced cage pockets 8. In each cage pocket 8 is inserted a controlling insert. The inner ring (3) may rotate in freewheeling direction (4) or in blocking direction (5).

In order to have a rolling element clutch (1) which retards the rotating elements in an exceptionally slow and smooth manner during rotation of the inner ring (3) in blocking direction (5), there is arranged at least one clutch roller (15) on either side of the controlling insert. Each clutch roller (15) has a relatively long axially extending rotational symmetrical outer surface, which is guided between a cylindrical outer raceway (16) of the outer ring (2) and a cylindrical inner raceway (17) of the inner ring (3). Rolling elements revolving between the outer ring 2 and the inner ring 3 are mounted into each controlling insert running between the outer ring (2) and the inner ring (3) may drive and displace the controlling insert either in freewheeling direction (4) or in blocking direction (5) within its cage pocket. Only during displacement of the controlling insert in blocking direction both clutch rollers (15) of each cage pocket get inclined gradually. The inclination of the clutch rollers (5) continues until the clutch rollers (15) become jammed between the outer raceway (16) and the inner raceway (17), thus blocking the rotational movement of the inner ring (3).

10 Claims, 3 Drawing Sheets

ROLLING ELEMENT CLUTCH

BACKGROUND OF THE INVENTION

The present invention relates to a rolling element clutch. A rolling element clutch is known, which has an outer ring, an inner ring and one row of rolling elements mounted on either side between the outer and inner ring. A plurality of clutch rollers are mounted between these two rows in the space between the two rings, these rollers giving way for free-wheeling during relative rotation of the two rings in one direction and stop relative rotation when relative running occurs in the opposite direction (German Edition "Maschinenelemente," G. Niemann, H. Winter, Vol. III, second completely revised Edition, Publishing Company Springer (1986), page 278, FIGS. 30/27b).

An important disadvantage is to be seen in the fact, that the clutch rollers of this known clutch may become jammed and abruptly blocked during their engagement between the two rings. The machine elements which are connected with the clutch members may then produce rather high inertia forces and corresponding high jamming forces within the clutch, these forces overloading the torque transmitting contact surfaces in the clutch. Moreover, the clutch rollers are difficult to become manufactured since they have a very complicated shape. The clutch rollers are also difficult to get mounted into the clutch, which results into a laborious assembly procedure and an expensive manufacture of the known rolling element clutch.

SUMMARY OF THE INVENTION

One object of this invention is to establish a rolling element clutch, where the machine elements connected with the clutch become relatively smoothly braked and blocked during rotation of the inner ring in blocking direction.

A further object of the present invention is to provide structural clutch members, which have a simple shape and which can be manufactured easily by using economical mass production methods.

In the rolling element clutch of this invention there is mounted a ring-type cage between an outer ring and an inner ring. This cage has a plurality of circumferentially spaced recesses, i.e. cage pockets. In each pocket is incorporated a controlling insert. At least one clutch roller is mounted on either side of each controlling insert. Every clutch roller has an outside end, which penetrates into an outside cavity in an axially inwardly showing side wall of the corresponding pocket, and an inside end, which penetrates into an inside cavity in an axially outwardly showing side wall of the controlling insert. Every controlling insert of the cage is carried by rolling elements, which freely roll in one or the other circumferential direction between an outer race of the outer ring and an inner race of the inner ring.

In the rolling element clutch of this invention each controlling insert of the cage ring becomes displaced within its pocket of the ring cage by the driving rolling elements, the direction of displacement depending on the rotational direction of the inner ring in freewheeling direction or in blocking direction. Thereby, each insert is guided sliding on adjacent wall portions of its cage pocket.

In case the inner ring rotates in freewheeling direction, then each control insert is driven by the rolling element and displaced circumferentially in its pocket. During this displacement the controlling insert slides on adjacent sidewall portions of the pocket and on the bore surface of the outer ring and/or on the outer surface of the inner ring. The clutch roller on either side of each controlling insert is being gripped between the outside cavity in the side wall of the cage ring and the corresponding inner cavity in the axially outwardly showing sidewall of the controlling insert and becomes finally axial adjusted.

The magnitude of the displacement distance of each controlling insert is preferably limited by an adjacent terminating edge wall in the pocket, which locks the displacement movement of the controlling insert, thereby ensuring alignment position of both clutch rollers at the end of displacement of the controlling insert. The inner ring is then able to rotate in freewheeling direction within the rolling element clutch.

In case the inner ring starts to rotate blocking direction, the cage ring may still somewhat rotate in freewheeling direction or may have come to a standstill. Each controlling insert of the cage ring is then driven by their rolling elements in blocking direction and displaced in its cage pocket accordingly.

The inside cavity of the controlling insert gets displaced relatively to the outside cavity of the cage pocket, whereby both opposite cavities of the clutch roller grasp the corresponding ends of the clutch roller and turn the clutch roller so that it starts to become inclined with respect to radial planes.

The inner ring continues to rotate in blocking direction and the clutch rollers become more and more inclined. Finally both ends of each clutch roller are becoming jammed between the corresponding inner raceway of the inner ring and the outer raceway of the outer ring, so that further rotation of the inner ring relative to the outer ring is blocked.

During the inclining movement of the two clutch rollers of each controlling insert and final blocking of the inner ring there may be produced axial forces in the contacts of both clutch rollers between inner raceway and outer raceway which push each clutch roller into the inside cavity of the axially outwardly showing sidewall of the controlling insert.

Since the axial forces of both clutch rollers of every insert act oppositely to each other on the controlling insert, the resulting axial force on the controlling insert is relatively small. The rolling elements, which support each controlling insert between inner ring and outer ring, carry relatively small axial reaction forces accordingly.

Braking during rotation of the inner ring in blocking direction occurs relatively slow, because of gradually growing sliding and jamming resistance of the clutch rollers during the clutch roller's inclining movement.

In case the inner ring begins to rotate in freewheeling direction then each controlling insert of the cage is driven by its rolling elements in freewheeling direction and the blocking contacts of the clutch rollers between outer raceway and inner raceway are becoming loosened. Accordingly.

Each controlling insert gets displaced within its cage pocket coming finally to a rest against an edge wall of the cage pocket. Concomitantly, all clutch rollers of the cage ring are getting aligned axially, so that they are able to freely roll in freewheeling direction between the corresponding inner and outer raceway again.

In the space between inner ring and outer ring there may be filled in a lubricant, which lubricates the active contact surfaces of the clutch rollers and of the rolling elements, thus protecting them from detrimental Sliding and/or rolling contact damages. Such lubricant may be a conventional oil or grease which contains suitable additives.

The rolling element clutch of this invention has a rather simple construction. The clutch can be equipped with conventional rolling elements, which are able to become manufactured in an extremely economical mass production.

The second embodiment of this invention has the effect, that the clutch roller have an extremely simple shape, which is normally used for cylindrical roller bearings.

In a third embodiment the face of the outside end and the face of the inside end of each clutch roller is spherically formed, each face being conform surrounded and narrowly gripped by the adjacent outside cavity or by the adjacent inside cavity respectively. This feature brings the effect, that both ends of each clutch roller are freely articulated in their cavities.

During rotation of the inner ring in blocking direction there are produced braking forces in the contacting surfaces between the inclining clutch rollers and their inner and outer races, some components of these forces may act in one or the other axial direction. They are transmitted via the spherical faces of the clutch rollers to the corresponding cavity of the cage ring or of the controlling insert and, thus, taken by the cage or by the controlling insert.

In a forth embodiment, both ends of each clutch roller have a smoothly reduced outer diameter so that these ends get a closer osculation on their raceways when the rollers become inclined and gradually jammed between the raceway of the inner ring and the raceway of the outer ring. This feature brings the effect, that the contact forces between the clutch roller ends and both raceways during inner ring blocking are taken by large contact surfaces and reduced accordingly. By this way overloading of the contact surfaces of the ends by too high jamming contact forces is avoided.

In a fifth embodiment the clutch rollers become inclined to a relatively great inclination angle until they assume their blocking inclined position between the inner and the outer raceway. This feature brings the advantage, that relatively high torques can be taken by the clutch during blocking.

A sixth embodiment has the effect, that each controlling insert revolving together with the cage ring in the clutch is held axially in the clutch by ball shaped rolling elements, which run in circular grooves between the inner ring and the outer ring.

A complementing seventh embodiment gives the advantage, that the ball shaped rolling elements can be mounted easily between the outer ring halves and the inner ring.

An additional complementing eight embodiment shows the possibility for the ball shaped rolling elements to become easily adjusted between the inner ring groove and the outer ring groove, so that even a certain "negative clearance" can be adjusted between rolling element and raceway, which causes a preload on the rolling elements. The preload avoids sliding movement of the rolling elements on their raceways during driving of the corresponding controlling insert in freewheeling or in blocking direction. The development of detrimental sliding marks on the raceways of the rolling elements is counteracted accordingly.

A ninth embodiment has the effect, that each controlling insert, which is sliding and guided on circumferentially extending sidewalls of its pocket during becoming displaced in freewheeling or in blocking position, has to overcome a certain rotational resistance of the cage ring.

This rotational resistance may be produced by one or more rubbing element rings, which rub on the outer or the inner surface of the cage ring, thus somewhat hindering the cage ring to rotate freely in the clutch. The rubbing element rings are preferably mounted on either end side of the clutch. Such rubbing element ring may even be a common sealing ring, for instance an elastic o-ring, made from a fluorine containing polymer, which causes a rather small rubbing resistance. The o-ring can easily be snapped into a circular groove of the inner or of the outer ring respectively, thereby closing an interior space of the clutch to the outside. A lubricant may be filled into this interior space to lubricate the sliding and rolling surfaces of the clutch elements during operation of the clutch. This lubricant is prevented from escaping from the interior of the rolling element clutch to the environment by the sealing o-rings.

A tenth embodiment has the effect, that the cage ring is held centrically between the inner and the outer ring. The rotating cage ring may be held and slide on a circular portion of the outer surface of the inner ring and/or on a circular portion of the inner surface of the outer ring.

BRIEF DESCRIPTION OF THE DRAWINGS

The rolling element clutch according to the invention will now be described in detail by way of example using the following drawings, wherein.

DETAILED DESCRIPTION OF THE PREFERRED EMBODIMENTS

An Appendix A has been attached at the end of this specification which includes a list of all the reference numbers and corresponding description of the components disclosed and described in this specification.

Figure 1:
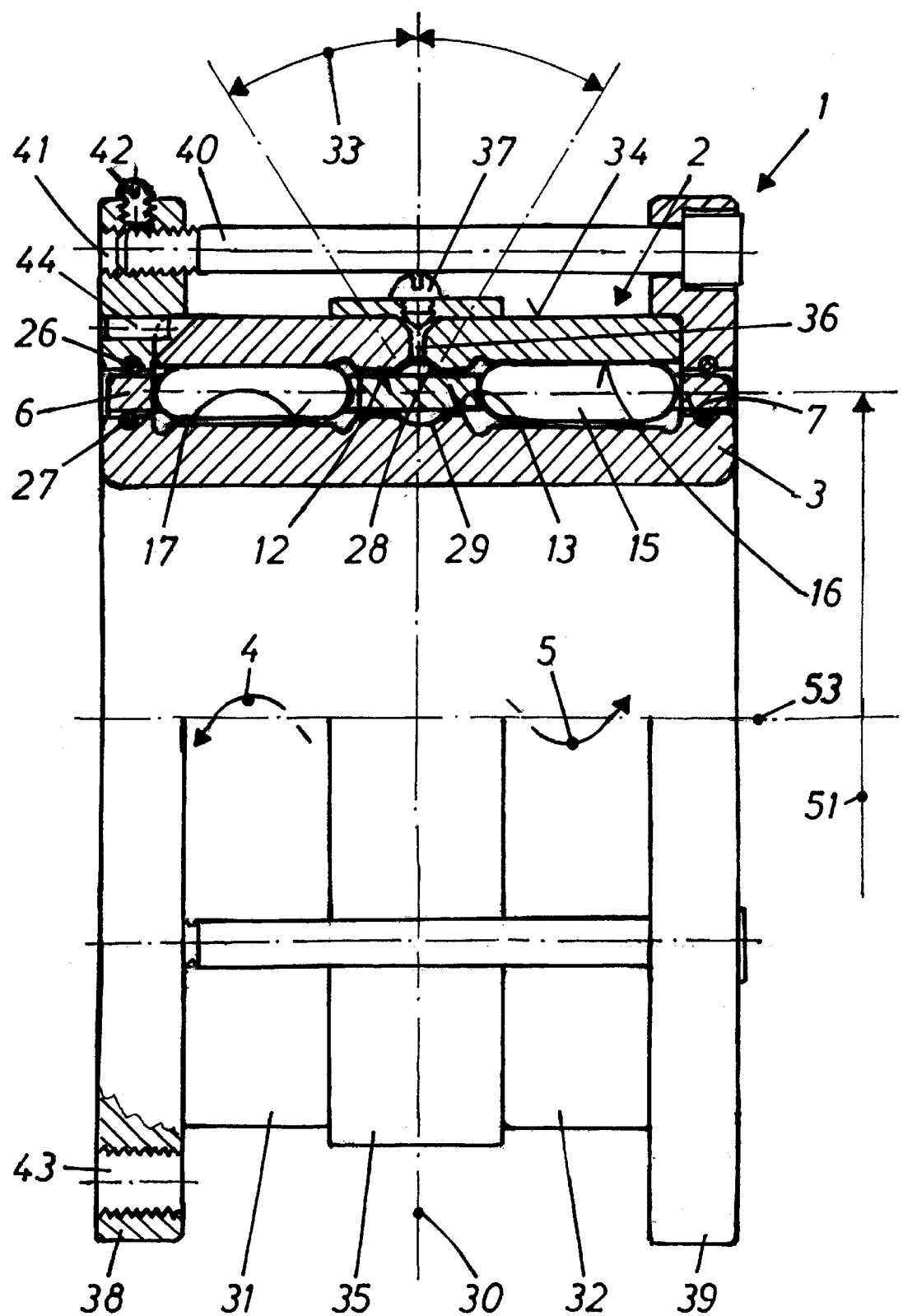
FIG. 1 shows a top view of a rolling element clutch having a fractionally cut cage ring along the line A—A in FIG. 2.

In FIG. 1, 1 designates a rolling element clutch having a two piece outer ring 2 and an inner ring 3, which is concentrically fitted within the outer ring 2. Both, outer ring 2 and inner ring 3 are made from hardened ball bearing steel. The inner ring 3 is rigidly connected with a shaft (not shown) in a conventional manner, this shaft rotating either in freewheeling direction 4 or in blocking direction 5.

A side to side symmetrically formed cage ring 6, made from abrasion-proof brass, is mounted concentrically between the outer ring 2 and the inner ring 3. The cage ring 6 slides rotationally on a cylindrical outer surface portion 7 at either end of the inner ring 3.

A plurality of radial through-going cage pockets 8 is worked into the cage ring 6. In each pocket 8 is a controlling insert 9 installed. The controlling insert 9 is made from a wear resistant material.

Figure 2:
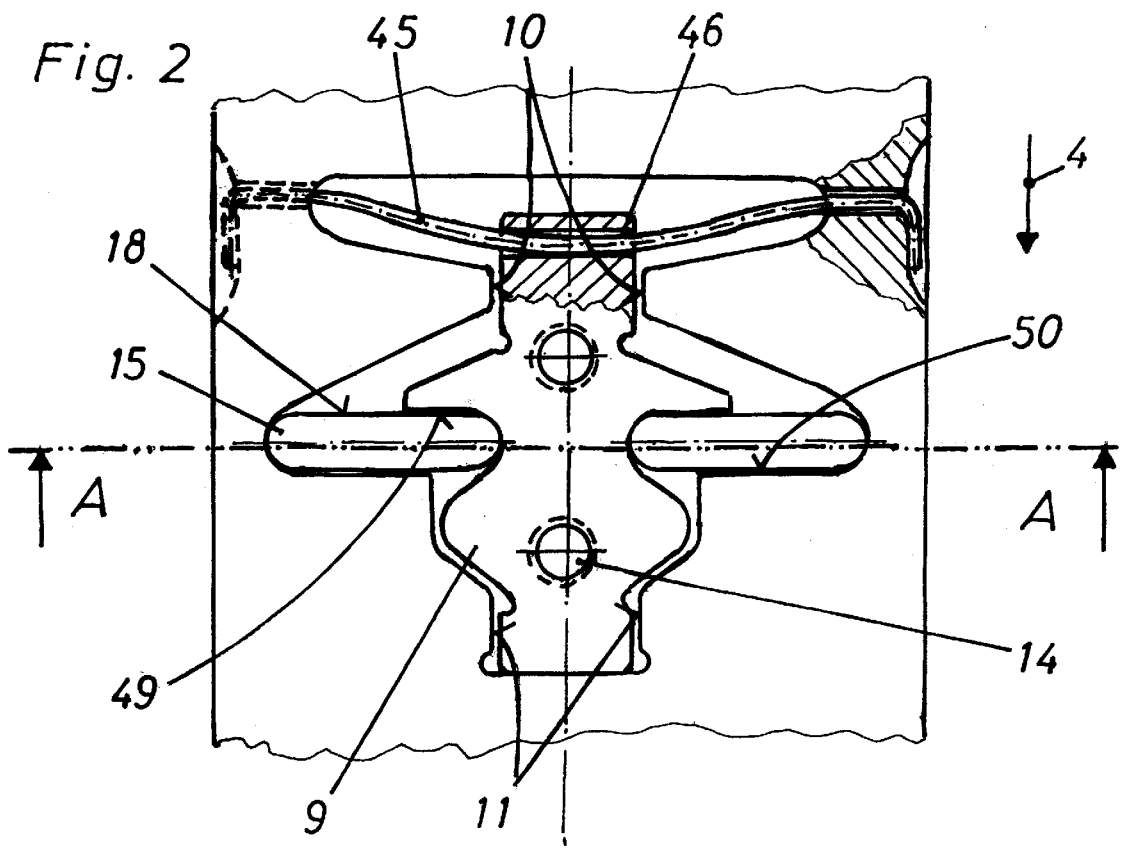
FIG. 2 shows a top view of a fractional portion of the cage ring in FIG. 1 removed from the clutch and being arranged in the plane of the drawing, whereby the controlling insert has taken its freewheeling position.
Figure 3:
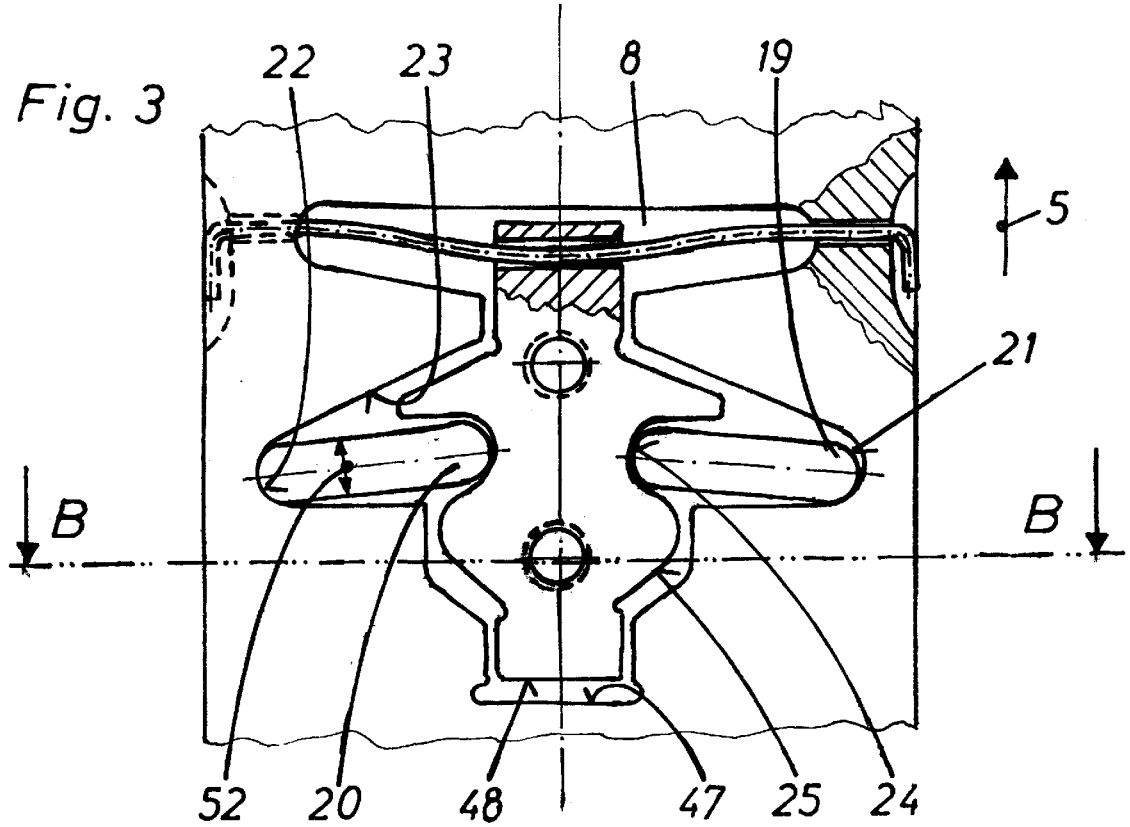
FIG. 3 shows a top view of a fractional portion of the cage ring in FIG. 1 removed from the clutch and being arranged in the plane of the drawing, whereby the controlling insert has taken its blocking position.

As can be seen in FIGS. 2 and 3 the controlling insert 9 can get displaced in circumferential direction within its cage pocket 8. During its displacement it slides along circumferentially extending side wall portions 10, 11 of the cage pocket 8 as well as on two cylindrical surface portions 12 in the bore of the outer ring 2 and adjacent concentric cylindrical outer surface portions 13 of the inner ring 3.

Figure 4:
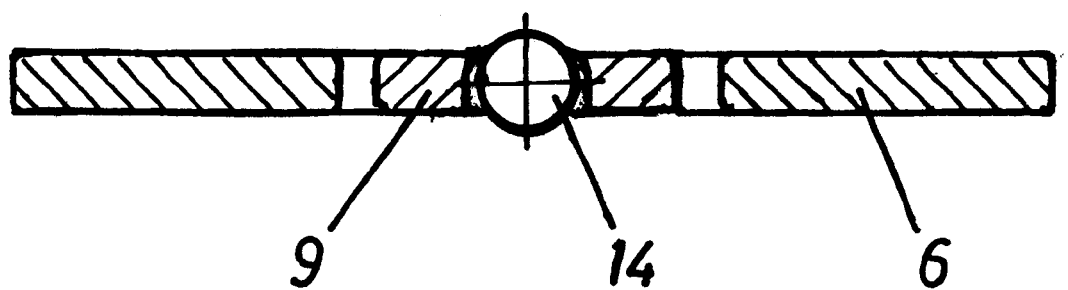
FIG. 4 shows a cut view of the cage ring along the line B—B in FIG. 3.

Two rolling elements 14 are installed in each controlling insert 9, which are arranged one after another in circumferential direction (FIG. 4). At the present example these two rolling elements 14 have a spherical outer surface and are manufactured from a hardened ball bearing steel. The rolling elements 14 can roll in circumferential direction between the outer ring 2 and the inner ring 3. The two rolling elements 14 of each controlling insert 9 push and drive the controlling insert 9 in circumferential direction, thereby holding and keeping it in axial direction between the outer ring 2 and the inner ring 3.

At both sides of each controlling insert 9 there is placed a clutch roller 15 between a cylindrical outer raceway 16 in the bore of the outer ring 2 and a cylindrical inner raceway 17 on the outer surface of the inner ring 3. Each clutch roller 15 is manufactured from a hardened ball bearing steel. The clutch roller 15 has an axially extending rotationally symmetric outer surface 18 and with an outside end portion 19 and an inside end portion 20. Both portions 19, 20 have spherical end faces 21, which lead smoothly into the outer surface 18 of the clutch roller 15.

At the present example each clutch roller 15 has an outer surface 18, the diameter of which is somewhat reduced towards the corresponding end face 21. at both end portions 19, 20 of the clutch roller 15. In case the clutch rollers 15 assume an axially aligned position, i.e. a non-inclined position, then there is present a small radial clearance of the rollers 15 between outer raceway 16 and inner raceway 17.

An outside cavity 22 is worked into both axially inwardly showing sidewalls 23 of each cage pocket 8. The outside spherical end face 21 of each clutch roller 15 is carried in the corresponding outside cavity 22 of the cage pocket 8. Thereby, the surface of the outside cavity 22 is narrowly surrounding the surface of the outside spherical end face 21. Similarly the inside spherical end face 21 of each clutch roller 15 is held in an inside cavity 24 of the corresponding controlling insert 9. The inside cavity 24 is worked into the adjacent axially outwardly showing side wall 25 of the controlling insert 9. The surface of the spherical end face 21 is narrowly surrounded by the surface of the inside cavity 24.

At both axial sides of the rolling element clutch 1 there is mounted a rubbing element 26. The rubbing element 6 is placed radial outwardly of the cage ring 6 between the outer ring 2 and the cage ring 6. At the present example this rubbing element 26 exists in the form of an Eastover o-ring, which slides on a smooth outer surface of the cage ring 6, thereby sealing an interior space of the clutch 1 from the outside.

In addition, there is mounted another rubbing element 27 on either side of the rolling element clutch 1, which is placed radial inwardly between the inner ring 3 and the cage ring 6 These two additional rubbing elements 27, again an eastomer o-ring, also seal the interior space from the outside. The rotational movement of the cage ring 6 in the rolling element clutch 1 is somewhat resisted by the rubbing effect of the sealing elements 26, 27 in the rolling element clutch 1.

The interior space of the rolling element clutch 1, which contains the clutch rollers 15 and the rolling elements 14, is hermetically closed by the sealing rubbing elements 26, 27 at it both sides. This interior space is advantageously filled with a suitable lubricant, grease or oil.

At the present example the spherical rolling elements 14 roll between a circular outer race groove 28 of the outer ring 2 and a circular inner race groove 29 of the inner ring 3 similar to a ball bearing. The outer ring 2 is divided into a left hand positioned half 31 and a right hand positioned half 32 by a radial centre plane 30, which passes through the centre of the rolling elements 14. The two halves 31 and 32 are arranged concentrically to each other and closely placed side by side. The halves 31, 32 form an outer race groove 28, which is composed of two circular semi-grooves. The two semi-grooves become contacted by the rolling elements 14 at a certain contact angle 33 with the radial centre plane 30.

A sleeve 35 is fixed on the outer surface 34 of both halves 31, 32. The sleeve 35 bridges a radial through going slit 36 between the two halves 31 and 32, thus keeping the halves 31, 32 centrically aligned to each other. A radial through going threaded hole is worked into the sleeve, which merges into the slit 36. The hole takes a lubricant filling plug 37. A flange ring 38 respectively 39 is fixed on the outer surface 34 and the adjacent side surface of the outer ring 2 on either side of the rolling element clutch 1.

There are means to adjust the axial position of the two halves 31, 32 of the outer ring 2 against each other. At the present example these means are built by three circumferentially spaced, axially extending screw bolts 40, which clamp and adjust the left hand flange ring 38 against the right hand flange ring 39 in axial direction (FIG. 1). During clamping the screwed end of each screw bolt 40 is screwed into a threaded hole 41 in the left hand flange ring 38. Thereby the width of the slit 6 between the two outer ring halves 31, 32 becomes changed. The clearance or axial preload of the rolling elements 14 between their semi-grooves is therefore adjusted by screwing the screw bolt 40 more or less into the threaded hole 41. After adjustment of the clearance a securing screw 42 may be screwed into the flanged ring 38, which secures the rotary position of the corresponding screw bolt 40.

In FIG. 1 is shown the left hand flange ring 38 having circumferentially threaded attachment holes 43. Into these holes 43 may be screwed in some bolts (not shown), in order to fasten the rolling element clutch 1 onto a machine frame or similar. A locking pin 44 is introduced into adjacent recesses between the left hand flange ring 38 and the outer ring half 31 preventing the outer ring half 31 from turning in the left hand flange ring 38.

Each controlling insert 9 has an axial bore 46, which takes a through going elastically bending wire 45. Both ends of this wire 45 are connected to the cage ring 6 in a manner, that it elastically pushes the controlling insert 9 in freewheeling direction 4 with a relatively small force, this both in freewheeling position (FIG. 2) and blocking position (FIG. 3) of the controlling insert 9. In case the inner ring rotates in freewheeling direction 4, then each controlling insert 9 is becoming displaced by the driving rolling elements 14, being moved within its cage pocket 8 in freewheeling direction 4. This movement of the controlling insert 9 is maintained by the spring action of the wire spring 45 until being stopped by catching means in the cage pocket 8.

At the present example these catching means are established by an edge wall 47 in the pocket 8, which shows in blocking direction 5. The controlling insert 9 becomes caught running with its adjacent stop wall 48 against the edge wall 47 during its movement in the cage pocket 8 in freewheeling direction 4. Thereafter, each controlling insert 9 keeps moving in circumferential direction being still driven by the rolling elements 14 in freewheeling direction 4. Thereby the clutch rollers 15 get narrowly guided between an axial extending guide wall 49 of the controlling insert 9 and an adjacent axial extending guide wall 50 on an edge of the cage pocket 8. The clutch rollers 15 of the cage ring 6 are held axially aligned between these two walls 49, 50 and may, thus, freely roll between their outer raceway 16 and their inner raceway 17 during circumferential movement of the controlling inserts 9 together with their cage ring 6 in freewheeling direction 4.

Advantageously, the diameter 51 through the centres of the clutch rollers 15 is made to have approximately the same magnitude as the diameter through the centres of the rolling elements 14. Moreover, the diameter 52 of the clutch rollers 15 is preferably made to have a slightly smaller magnitude than the magnitude of the diameter of the rolling elements 14.

If, in the following, the inner ring 3 becomes to rotate in blocking direction 5, then each controlling insert 9 of the cage ring 8 is driven by its rolling elements 14 in blocking direction 5, thus becoming displaced in its cage pocket 8 against the spring force of the wire spring 45 in blocking direction 5. Thereby, the ends 19 and 20 of each clutch roller 15 are grasped by the cavity 22 respectively 24 and gradually moved into an inclined position relatively to the axis 53 of the rolling element clutch 1.

The inclining movement continues until the clutch roller 15 starts to become jammed between its raceways 16 and 17. Because of growing inclination angle of each clutch roller 15 the jamming forces between the raceways 16, 17 become gradually higher, so that at the end of inclining movement the jamming forces are high enough to block relative rotational movement of the inner ring 3 in the rolling element clutch 1.

Further modifications of the above demonstrated examples are possible within the scope of this invention. For example, the outer surface of the clutch rollers 15 of the rolling element clutch 1 must not be shaped cylindrically. Their outer surfaces can also be shaped slightly convex.

Instead of one row of rolling elements there can be two or more rows of rolling elements, which are installed in the controlling inserts along the circumference of the rolling element clutch. In this case, the rolling elements may be tapered rollers, which are adjusted axially against each other to have no bearing clearance, adjusting of the tapered rollers of each row may occur by using commonly known adjusting means.

Now that the preferred embodiments of the present invention have been shown and described in detail, various modifications and improvements thereon will become readily apparent to those skilled in the art. Accordingly, the spirit and scope of the present invention is to be construed broadly and limited only by the appended claims and not by the forgoing specification.

-14-

APPENDIX A

| | | |
|---|---|---|
| | 1 | rolling element clutch |
| | 2 | outer rings |
| | 3 | inner rings |
| 5 | 4 | freewheeling direction |
| | 5 | blocking direction |
| | 6 | cage ring |
| | 7 | cylindrical end side portion on either side of the inner ring 3 |
| | 8 | cage pocket |
| 10 | 9 | controlling insert |
| | 10 | (first) wall portion on either side of the cage pocket 8 |
| | 11 | (second) wall portion on either side of the cage pocket 8 |
| | 12 | cylindrical portion in the bore of the outer ring 2 |
| | 13 | cylindrical portion on the outer surface of the inner ring 3 |
| 15 | 14 | (ball shaped) rolling element |
| | 15 | clutch roller |
| | 16 | outer raceway in the bore of the outer ring 2 |
| | 17 | inner raceway on the outer surface of the inner ring 3 |
| | 18 | rotational symmetric outer surface of the clutch roller 15 |
| 20 | 19 | outside end portion of the clutch roller 15 |
| | 20 | inside end portion of the clutch roller 15 |
| | 21 | spherical end face of the end portions 19 and 20 |
| | 22 | outside cavity in the side wall 23 of the cage ring 6 |
| | 23 | axial inwardly showing side wall of the cage pocket 8 |
| 25 | 24 | inside cavity in the axial outwardly showing side wall 25 of the controlling insert 9 |
| | 25 | axial outwardly showing side wall of the controlling insert 9 |
| | 26 | radial outwardly mounted rubbing element (o-ring) |
| | 27 | radial inwardly mounted rubbing element (o-ring) |
| 30 | 28 | outer race grooves |

201390.1

-15-

| | 29 | inner race grooves |
|---|---|---|
| | 30 | radial extending center planes through the rolling elements 14 |
| | 31 | left hands positioned half of the outer ring 2 |
| | 32 | right hands positioned half of the outer ring 2 |
| 5 | 33 | contact angle |
| | 34 | cylindrical outer surface of the outer ring halves 31, 32 |
| | 35 | centering sleeve |
| | 36 | radial extending slit between the two outer ring halves 31, 32 |
| | 37 | lubrication filling screw |
| 10 | 38 | left hand flange ring |
| | 39 | right hand flange ring |
| | 40 | (clearance adjusting) screw bolt |
| | 41 | threaded hole |
| | 42 | securing screw |
| 15 | 43 | (through going) attachment hole |
| | 44 | locking pin |
| | 45 | wire spring |
| | 46 | axial extending through going whole in the controlling insert 9 |
| | 47 | edge wall in the cage pocket 8 showing in blocking direction 5 |
| 20 | 48 | stop wall of the controlling insert 9 showing in freewheeling direction 4 |
| | 49 | axial extending guide wall of the controlling insert 9 |
| | 50 | axial extending guide wall of the cage pocket 8 |
| | 51 | diameter through the centers of the clutch rollers 15 of the rolling |
| 25 | | element clutch 1 |
| | 52 | outer diameters of the clutch rollers 15 |
| | 53 | center line of the rolling element clutch 1 |

I claim:

1. A rolling element clutch comprising an outer ring, a concentrically within the outer ring carried, in the one freewheeling direction or in other blocking direction rotating inner ring and a rotationally carried cage ring there between having a plurality of circumferentially arranged radial through-going cage pockets, in each of which is inserted a circumferentially sliding displaceable controlling insert, characterized in that the controlling insert (9) has in circumferential direction driving and axially supporting rolling elements (14), which are mounted in the controlling insert (9) between the outer ring (2) and the inner ring (3) and at least one clutch roller (15) is mounted on either side of the controlling insert (9) between a cylindrical outer raceway (16) of the outer ring (2) and a cylindrical inner raceway (17) of the inner ring (3), this clutch roller (15) having a relatively long rotational symmetric outer surface (16), an outside end portion (19) being narrowly surrounded by an outside cavity (22) which is worked into an axially inwardly showing sidewall (23) of the cage pocket (8) and an inside end portion (20) being narrowly surrounded by an inside cavity (24) which is worked into the axial outwardly showing sidewall (25) of the controlling insert (9), wherein during rotation of the inner ring (3) in freewheeling direction (4) the controlling insert (9) is driven by the rolling elements (14) and is placed in freewheeling direction (4) until becoming stopped by edge means in the corresponding cage pocket (8), so that the outer surface (16) of each clutch roller (15) becomes narrowly guided between a guide wall (49) of the controlling insert (9) showing in freewheeling direction (4) and an adjacent guide wall (50) of he cage pocket (8) of the cage ring (6), and during rotation of the inner ring (3) in blocking direction (5) the controlling insert (9) is driven by the rolling elements (14) and is placed in blocking direction (5) in its cage pocket (8), whereby the guide wall (49) of the controlling insert (9) and the guide wall (50) of the cage pocket (8) become more distant to each other and each clutch roller (15) is rasped by the outside cavity (22) and the inside cavity (24) and positioned inclined in order to become jammed between its outer raceway (16) and its inner raceway (17).

2. Rolling element clutch according to claim 1, characterized in that the clutch rollers (15) of the rolling element clutch (1) have a cylindrical outer surface (18).

3. Rolling element clutch according to 1, characterized in that the clutch rollers (15) of the rolling element clutch (1) have two opposite end portions (19,20) with hemispherical ends, which smoothly merge into the outer surface (18) of the clutch rollers (15).

4. Rolling element clutch according to claim 3, characterized in that the outer surface (8) of the clutch rollers (15) have only at their end portions (19,20) towards the ends of their end portions (19,20) gradually reduced diameters.

5. Rolling element clutch according to claim 1, characterized in that the clutch rollers (15), when being brought into an axially aligned position, have a small radial clearance between their outer raceway (16) and their inner raceway (17).

6. Rolling element clutch according to claim 1, characterized in that the outer surface of each rolling element (14) of each controlling insert (9) is made spherical and arranged between an outer race groove (28) of the outer ring (2) and an inner ring groove (29) of the inner ring (3).

7. Rolling element clutch according to claim 6, characterized in that the outer ring (2) is split into two side by side arranged concentric halves (31, 32) by a radial extending centre plane (30), which passes through the centers of the rolling elements (14), the two halves carrying each a portion of the outer race groove (28).

8. Rolling element clutch according to claim 7, characterized in that the rolling elements (14) have a contact angle (33) on their two portions of the outer race groove (28), which is oblique to the radial centre plane (30), whereby adjusting elements (40) are provided for, which serve to adjust the clearance of the rolling elements by axial positioning of the two portions of the outer race groove (28) against each other.

9. Rolling element clutch according to claim 1, characterized in that rubbing elements (26 respectively 27) are mounted between the outer ring (2) and the cage ring (6) and/or between the inner ring (3) and the cage ring (6).

10. Rolling element clutch according to claim 1, characterized in that the cage ring (6) is sliding supported on a concentric portion (12) in the bore of the outer ring (2) and/or on a concentric portion (13) of the outer surface of the inner ring (3).

* * * * *